Patented Mar. 26, 1946

2,397,194

UNITED STATES PATENT OFFICE 2,397,194

SYNTHETIC RESINS AND ADHESIVES AND METHOD OF MAKING SAME

Gustavus Harry Miller, Portland, Oreg.

No Drawing. Application July 28, 1943,
Serial No. 496,429

12 Claims. (Cl. 260—69)

REISSUED
JAN 14 1947

The present invention relates to urea-formaldehyde resin compositions and, while they are not necessarily limited thereto, the compositions are particularly suitable for use as adhesives or as a base for adhesive compounds.

Urea-formaldehyde condensation products have heretofore been used as adhesives but they were generally unstable and commercially impracticable because of an inherent tendency to harden prematurely. Moreover, such adhesives possessed a highly obnoxious odor which necessitated costly ventilation installations in areas where the adhesives were applied and cured. Furthermore, these adhesives were produced by methods which were relatively slow, extending generally over a period of from twelve to twenty-four hours, and special, cumbersome apparatus was required so that the manufacturing costs thereof were relatively high.

Thermo-setting resinous adhesives are well adapted to plywood manufacture because of the speed with which the bond may be effected in a hot press operation and the improved characteristics of the bond itself. The adhesive products of the present invention may be used with either cold or hot-press methods of plywood manufacture and form permanent bonds having excellent water resistant properties. Because of a high solids content, the adhesive flows freely into a continuous film between the superimposed surfaces with a minimum of migration into the cellular structure of the wood which migration would tend to leave a starved glue line.

It is an object of the present invention to provide a new and improved urea-formaldehyde type condensation product which is characterized by unusual keeping qualities so as to render it ideally suited for distribution according to normal commercial practice.

A further object of the present invention is to provide a new and improved adhesive of the urea-formaldehyde type which is crystal clear, substantially odorless, and particularly suitable for use in plywood manufacture.

A still further object of the present invention is to provide a new and improved urea-formaldehyde type adhesive and method for producing the same quickly and at low cost.

Another object of the invention is to provide a simplified method of producing a crystal clear resinous condensation product of the urea formaldehyde type.

The invention will be described with particular reference to the preparation of resinous compounds particularly suitable as adhesives or as a base for adhesive products, although it will readily be understood by those skilled in the art that the invention is not necessarily so limited in that the product may also be used in connection with the preparation of molding resins of a crystal clear nature.

This invention is based upon the discovery that if urea and formaldehyde are condensed in the presence of a large excess of ammonia a product may be obtained which is crystal clear and free of bubbles. The condensation may be arrested while the substance is in the form of a thick, viscous liquid and which product is particularly suitable as an adhesive or as an adhesive base.

I am aware that adhesives have been produced heretofore using these same ingredients but in all such instances only a very small amount of ammonia, such as 1 or 2 cc. per mol of formaldehyde were employed. In such cases, the ammonia is used only as a catalyst to initiate and promote the condensation reaction which is maintained by continued heating until such a portion of water is removed as to form a relatively viscous mass. Depending upon the particular proportions of urea and formaldehyde employed and the particular process or method by which the reaction is carried out a product is formed having properties as an adhesive and which may even be semi-transparent. Where only such a small amount of ammonia is used the condensation reaction is not entirely checked upon removal of the heat but continues, even though more or less slowly, at room temperature, and eventually passes from the hydrophilic to the hydrophobic state and ultimately into a solid. Such adhesives are characterized by a cloudy or milky color and, while they are transparent in a sense, they are not truly crystal clear. Furthermore, these substances are obnoxiously odorous due to the presence of excess formaldehyde and consequently unpleasant to handle. The principal disadvantage, however, is the fact that such adhesives are not stable and when once prepared must be used within a matter of a relatively few days. Due to progressive bodying or thickening of the material in their containers during transit or in storage and, particularly in hot seasons, it is practically essential that the consumer himself prepare the adhesive. To do so necessitates a costly installation of specialized equipment and a trained personnel to supervise the production of the adhesive and the use thereof. These adhesives, therefore, are not available to the small consumer dependent upon some other source of supply which might not be readily at hand.

In the prior art the quality of stability is frequently accorded to urea-formaldehyde type adhesives, a normally useful life of which extends over a period of from five to ten days. This cannot properly be termed stability in a commercial sense which ordinarily requires that the product have a useful life from at least two to six months. The adhesives of the present invention are particularly characterized by their unusually long life, extending in some instances, to over twelve months without even then showing signs of appreciable bodying.

In accordance with the present invention, formaldehyde and urea in the approximate proportions of 3 mols of aqueous formaldehyde and 1¼ to 3 mols of urea are reacted in the presence of from 1 to 3⅔ mols of aqueous ammonia. Except in those cases in which the larger amounts of ammonia are employed, the ammonia is first mixed with the formaldehyde and then the urea is stirred into the liquid.

After the urea has thoroughly dissolved, accompanied by an exothermic reaction of the ingredients, heat is gradually applied until the mixture commences to boil. The heat is controlled during this period to avoid overheating the mass which might result in driving off the ammonia prematurely. If this were done the final product would have a milky white color and possess an unduly short life. Heat is applied just sufficiently to maintain the mixture in a boiling condition which will normally occur at a temperature from about 95 to 100 degrees C. This heating is continued until the mass is concentrated by evaporation of water to substantially 40 to 60% of its original mass. As the concentration progresses, the temperature will gradually rise, and then more rapidly as the end point is reached. In the preparation of an adhesive the heat is removed somewhat short of the end point, that is, when the mass has reached a relatively viscous or syrupy condition which usually occurs within 25 to 35 minutes of boiling.

The final product is crystal clear, with no entrapped bubbles of gas, and possesses no perceptible odor. The large amount of ammonia which is used in the preparation of the adhesive reacts with the formaldehyde in the formation of hexamethylenetetramine and which side reaction is carried out so thoroughly that the final product is completely lacking in any odor of formaldehyde. The excess ammonia is, in turn, driven off in the boiling of the mass, its liberation being facilitated by mechanical stirring during and after the cooking period.

For any given ratio between formaldehyde and urea within the approximate range stated, the quantity of ammonia may be varied appreciably but if such variations are excessive, progressively unsatisfactory results will be noted. In general, the quantity of ammonia required varies with the amount of urea employed. Thus when only 1¼ mols of urea are used with 3 mols of formaldehyde, only 1 mol of ammonia need be employed. If substantially less than this amount of ammonia is used, the product is cloudy, has unduly short life and quickly turns solid. In such case the odor of formaldehyde may be detected indicating that the ammonia concentration was not sufficient to effect complete removal of the excess formaldehyde before the ammonia itself was driven off by the heating. This free formaldehyde remaining in the solution following the cooking operation apparently results in continuation of the polymerization reaction even at room temperature. If the amount of ammonia be unduly increased, then a certain portion of the urea will be precipitated from the solution indicating too great a dilution of the formaldehyde concentration, due to excessive formation of hexamethylenetetramine and the product will have poor adhesive qualities and be characterized by a murky appearance.

If the proportion of urea be increased to 3 mols per 3 mols of formaldehyde, then the amount of ammonia should be increased to approximately 1⅓ mols. If the amount of ammonia be reduced materially below this amount, the product, as in the case above, will have a milky white color and will be unstable, thickening in a relatively short period of time corresponding substantially to the degree in which the proportion of ammonia is reduced. On the other hand, with such a high proportion of urea, the amount of ammonia may be increased to as high as 3⅔ mols with further advantageous results. But if the proportion of ammonia be increased much above 4 mols, urea will be caused to precipitate from the solution and the product will have poor adhesive characteristics.

For illustrative purposes the following examples are given, it being understood that these are intended for illustration only rather than limiting the invention to the particular details set forth therein.

*Example #1*

Sixty-one grams of 28% aqueous ammonia are slowly added with constant stirring, accompanied by an exothermic reaction, to 244 grams of 37% aqueous formaldehyde in an open vessel. Seventy-five grams of urea are then added to the mixture and stirring continued until completely dissolved. Heat is gradually applied until the solution commences to boil. The solution is kept boiling rather mildly at a temperature of about 95 to 100 degrees C. for about 25 to 35 minutes or until the fumes of the excess formaldehyde are driven off together with the excess ammonia and aqueous distillate and the solution concentrated to approximately ½ of its original volume. The condensate then cooled to room temperature will be of a syrupy consistency, crystal clear and practically odorless.

This product has good stability in containers and excellent properties as an adhesive.

It is pointed out that in order to achieve a crystal clear product, the ammonia must be added to the mixture at the start or beginning of the process and not during the cooking period. This applies in all cases.

*Example #2*

Seventy-three grams of 28% aqueous ammonia are added slowly with stirring to 244 grams 37% aqueous formaldehyde in an open vessel. One hundred and twenty grams of urea are then added to the mixture and stirred until completely dissolved after which heat is gradually applied until the solution commences to boil. The solution is gently boiled for a period of time, such as 25 to 35 minutes or until the fumes of the unreacted formaldehyde and excess ammonia are driven off and sufficient water distilled off so as to concentrate the mass to approximately ½ of its original volume.

This product, like that previously described, possesses excellent adhesive characteristics and is unusually stable so that it may be stored in containers at room temperature over a period of months without appreciable bodying. This adhesive may be used in this form or may be extended with various fillers, such as hereinafter described in the manufacture of laminated products and plywood panels by the hot press method.

Example #3

Seventy-three grams of 28% aqueous ammonia are slowly stirred into 244 grams of 37% aqueous formaldehyde in an open vessel and 180 grams of urea are then added to the mixture with stirring until completely dissolved. The heat is gradually applied until the temperature reaches the boiling point and the mixture is maintained gently boiling until it is concentrated to about 60% of its original volume. The fumes of the unreacted formaldehyde are thus driven off together with the excess ammonia and the product will be crystal clear, practically odorless and of a rather heavy syrupy consistency.

It will be observed that this adhesive product has an unusually high solids content and is particularly suitable for use in bonding together relatively porous surfaces with a minimum of migration of the adhesives into the cellular structure of the material. Because of its high solids content, low shrinkage and unusual clarity at end point of solidification, the product also produces an outstanding moulding resin for forming clear glass-like products which can easily be machined, bored and polished.

Example #4

One hundred and eighty grams of urea are added to 244 grams of 37% aqueous formaldehyde in a 600 ml. beaker and stirred until thoroughly mixed. Two hundred and thirty-one grams of 28% aqueous ammonia are then added to the mixture with stirring. Heat is gradually applied until the solution commences to boil. The solution is kept boiling rather mildly at a temperature of about 95 to 100 degrees C. for about 25 minutes. The temperature slowly rises for 10 to 12 minutes before reaching the end point to approximately 135 to 137 degrees C. The solution, concentrated to approximately 40% of its original combined weight and cooled to room temperature, will be of a syrupy consistency, crystal clear and practically odorless. The product in this instance, formed with a large amount of ammonia has excellent keeping properties and is particularly suitable for mixing with flour, as hereinafter mentioned, to provide an economical adhesive for plywood veneer.

The resinous products of the invention may readily be used as moulding resins for producing clear, glass-like products and because of their high solids content, have extremely low shrinkage characteristics.

If it is desired to extend the adhesive base, formed by any of the above examples, without impairing its clarity, white dextrin dissolved in cold water may be slowly stirred into the adhesive at the end of the condensation period and cooking continued for another three to five minutes. This final product is crystal clear, odorless and possesses good adhesive qualities and may be used in either hot or cold press methods of manufacture.

The adhesives as described, while particularly suitable for use in hot press method manufacture of laminated articles, such as plywood, may equally well be used in cold press methods. In order to reduce the setting time when using cold press method, suitable hardeners may be added to the adhesive immediately prior to the spreading of the adhesive upon the surfaces.

Any of the above adhesives may be successfully modified with the addition of suitable organic or inorganic extenders depending upon the particular usage for the adhesive. Thus, for example, wheat, tapioca, rye or other protein flour may be added to the resin base with a suitable quantity of water in the reaction vessel at the end of the condensation period. If desired, the flour may first be cooked independently in water to a syrupy consistency before adding to the resin base. Instead of flour, inorganic material, such as asbestos, talc, or colloidal clays may be added as extenders. More often, the extenders are added to the resin base by the consumer just prior to the use of the adhesive.

Whether or not fillers or extenders are used, the adhesives of the invention and as illustrated by the examples given are unusually stable and may be stored for months after preparation and before use without impairing the quality of the product.

This application is a continuation-in-part of application Serial No. 298,058, filed October 5, 1939.

I claim:

1. A liquid thermo-setting resin adhesive composition comprising the resinous condensation product obtained by heat-reacting a mixture of ingredients consisting of 37% aqueous formaldehyde, urea, and 28% aqueous ammonia in an open vessel at a temperature of from 95 to 100° C. for from 25 to 35 minutes, the said ingredients being present in the mol ratio of about 3 mols formaldehyde, 1¼ to 3 mols urea and from 1 to between 1⅕ and 3⅘ mols ammonia, the quantity of ammonia varying with the urea content of said mixture and being about 1 mol when the urea content is about 1¼ mols and increasing to from 1⅕ to 3⅘ when the urea content is increased to 3 mols.

2. A liquid thermo-setting resin composition comprising the condensation product obtained by heat-reacting a mixture of ingredients consisting of 37% aqueous formaldehyde, urea and 28% aqueous ammonia in an open vessel at a temperature of from 95 to 100° C., the said ingredients being present in the mol ratio of about 3 mols formaldehyde, 1¼ to 3 mols urea and from 1 to between 1⅕ and 3⅘ mols ammonia, the quantity of ammonia varying with the urea content of said mixture and being about 1 mol when the urea content is 1¼ mol and increasing to from 1⅕ to 3⅘ mols when the urea content is increased to 3 mols, said mixture being reacted within said temperature range and concentrated with loss of water until the mass of the final product is between 40 and 60% of the original combined weight.

3. A crystal clear, substantially odorless thermo-setting resin composition comprising the reaction product resulting from heat-reacting a mixture of ingredients consisting of aqueous formaldehyde, urea, and aqueous ammonia in an open vessel substantially at the boiling point of the mass for from 25 to 35 minutes, the said ingredients being present in the mol ratio of about 3 mols formaldehyde, 1¼ to 3 mols urea and from 1 to between 1⅕ and 3⅘ mols of ammonia, the quantity of ammonia varying with the urea content of said mixture and being about 1 mol when the urea content is about 1¼ mols and increasing to from 1⅕ to 3⅘ mols when the urea content is increased to 3 mols.

4. A liquid, thermo-setting adhesive composition comprising the resinous condensation product obtained by heat-reacting a mixture of ingredients consisting of 244 grams of 37% aqueous formaldehyde, 75 grams of urea, and 61 grams of 28% aqueous ammonia in an open vessel at a temperature of 95 to 100° C. for about 25 to 35 minutes.

5. A liquid, thermo-setting adhesive composition comprising the resinous condensation product obtained by heat-reacting a mixture of ingredients consisting of 244 grams of 37% aqueous formaldehyde, 120 grams urea, and 73 grams of 28% aqueous ammonia in an open vessel at a temperature sufficient to maintain gentle boiling of the mixture for from 25 to 35 minutes.

6. A liquid thermo-setting resinous adhesive composition obtained by heat-reacting a mixture of ingredients consisting of 244 grams of 37% aqueous formaldehyde, 180 grams of urea, and 73 grams of 28% aqueous ammonia in an open vessel and with gentle boiling for such a period of time until the mixture is concentrated to about 60% of its original volume.

7. The process for the manufacture of a liquid thermo-setting resinous adhesive composition which comprises forming a mixture of ingredients consisting of 37% aqueous formaldehyde, urea and 28% aqueous ammonia in the mol ratio of approximately 3 mols formaldehyde, from 1¼ to 3 mols urea and from 1 to between 1⅕ to 3⅘ mols ammonia, the amount of ammonia present in the mixture being dependent upon the urea content thereof and being about 1 mol when 1¼ mols urea is present in said mixture and being increased to from 1⅕ to 3⅘ mols when the urea content is increased to 3 mols, and heat-reacting said mixture in an open vessel at a temperature of from about 95 to 100° C. until the evaporation of water from the mixture has resulted in the concentration thereof from 40 to 60% of its original mass.

8. The process for the manufacture of a crystal clear, odorless, thermo-setting resinous composition which comprises forming a mixture of ingredients consisting of 37% aqueous formaldehyde, urea and 28% aqueous ammonia in the mol ratio of approximately 3 mols formaldehyde, from 1¼ to 3 mols urea and from 1 to between 1⅕ and 3⅘ mols ammonia, the amount of ammonia, the amount of ammonia present in the mixture being dependent upon the urea content thereof and being about 1 mol when 1¼ mols urea is present in said mixture and being increased to from 1⅕ to 3⅘ mols when the urea content is increased to 3 mols, and heat-reacting said mixture in an open vessel at a temperature of from 95 to 100° C. for from 25 to 35 minutes.

9. The process for the manufacture of a crystal clear, odorless, thermo-setting resinous composition which comprises forming a mixture of ingredients consisting of 37% aqueous formaldehyde, urea and 28% aqueous ammonia, the ratio of said ingredients being about 244 grams 37% aqueous formaldehyde, from 75 to 180 grams urea and from 61 to 73 grams 28% aqueous ammonia, the ammonia being slowly added with constant stirring into the formaldehyde in an open vessel and the urea then added and stirred until completely dissolved, the solution being then heat-reacted in said open vessel at a temperature of from 95 to 100° C. for a period of from 25 to 35 minutes.

10. The process for the manufacture of a liquid thermo-setting resinous adhesive composition which comprises forming a mixture of ingredients consisting of 37% aqueous formaldehyde, urea and 28% aqueous ammonia, the ratio of said ingredients being about 244 grams 37% aqueous formaldehyde, 75 grams urea, and 61 grams 28% aqueous ammonia, the ammonia being slowly added with constant stirring into the formaldehyde in an open vessel with the urea then added until completely dissolved, heating being then applied until the solution commences to boil and the solution then kept boiling mildly with the evaporation of water from the mass for from 25 to 35 minutes.

11. The process for the manufacture of a liquid thermo-setting resinous adhesive composition which comprises forming a mixture of ingredients consisting of 37% aqueous formaldehyde, urea and 28% aqueous ammonia, said ingredients being in the ratio of approximately 244 grams 37% aqueous formaldehyde, 120 grams urea and 73 grams 28% aqueous ammonia, the ammonia being slowly stirred into the formaldehyde in an open vessel, the urea being then added with stirring until completely dissolved, heat being then applied gradually until the solution commences to boil and the solution gently boiled for from 25 to 35 minutes.

12. The process for the manufacture of a liquid thermo-setting resinous adhesive composition which comprises forming a mixture of ingredients consisting of 37% aqueous formaldehyde, urea and 28% aqueous ammonia in the ratio of approximately 244 grams 37% aqueous formaldehyde, 180 grams urea and 73 grams 28% aqueous ammonia, the ammonia being slowly stirred into the formaldehyde in an open vessel and urea then added until completely dissolved, heat being then gradually applied until the temperature reaches the boiling point and the mixture then maintained in a gently boiling condition with the evaporation of water until it is concentrated to about 60% of its original volume.

GUSTAVUS HARRY MILLER.